May 11, 1954   J. M. AGUIRRE-GONZALO ET AL   2,677,867
CONCRETE FORM LINING AND IMPREGNANT THEREFOR
Filed Sept. 26, 1950
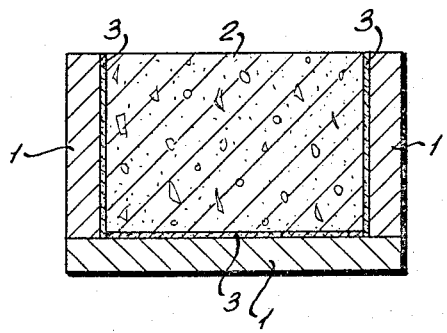
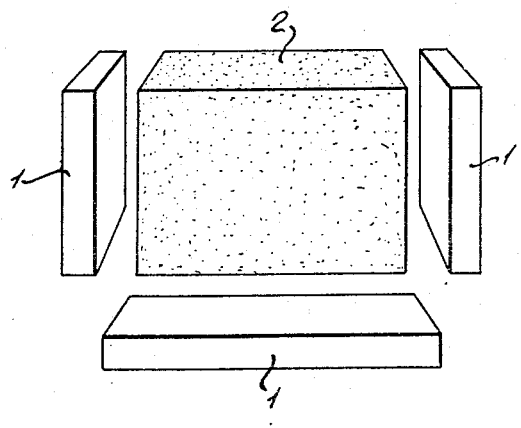
INVENTOR
JOSÉ MARIÁ AGUIRRE-GONZALO
JAIME CASTEJÓN-CHACÓN
AGENT

UNITED STATES PATENT OFFICE 2,677,867

CONCRETE FORM LINING AND IMPREGNANT THEREFOR

José Maria Aguirre Gonzalo and Jaime Castejon Chacon, Madrid, Spain

Application September 26, 1950, Serial No. 186,914

Claims priority, application Spain October 22, 1949

4 Claims. (Cl. 25—122)

The invention relates to a composition for coating concrete form lining material.

A large part of the cost involved in the casting or erection of concrete work in forms, particularly those composed of wood, is caused by the difficulty of removing the used planks. Usually, the planks are damaged, which restricts the repeated use of the forms.

The deterioration of the form linings or planks is brought about by the adhesion of the concrete, and it has already been proposed to use substances reducing said adhesion.

Such substances should satisfy the following conditions:

(1) They should reduce the adhesion between the concrete and the planking to avoid the use of levers for removing the planks.

(2) They should increase the life of the planking by preventing as far as possible the impregnation of the wood planks with lime which affects unfavorably the physico-mechanical properties of the planks.

(3) They should obviate the need of cleaning the planks after each use so as to save labor cost and render the casting and molding of the concrete more economical.

It is a principal object of the invention to provide concrete form materials which are readily removed from the cast concrete and which, after removal, are substantially free of adherent concrete particles and are ready for a new use.

Another object of the invention is to provide a composition effectively preventing the adhesion of cement to wood or similar form linings.

Other objects and advantages will be apparent from a consideration of the specification and claims.

According to the invention, the wooden planks are impregnated with a composition containing: (a) detergents preventing the adhesion of concrete, such as mineral oils or their sulfonated derivatives, fats, naphthols, tar derivatives and the like, (b) wood preserving agents such as phenols or cresols, and (c) ammonium salts and/or organic bases derived from ammonia.

Some of these compounds combine detergent and preserving properties; on the other hand, several compounds of each group may be incorporated in the impregnating compositions.

In a preferred form of the invention, the planks are impregnated with a solution containing ammonium salts of different inorganic acids, for instance 20 to 60 g. of a mixture of ammonium carbonate, ammonium sulfate and ammonium chloride, dissolved in 1 liter of water, 1 to 10 g./l. of phenols and/or cresols, at least 2 g./l. of coal tar emulsions and/or wood tar treated with soda, and an aromatic nitrogen base such as pyridine, pyrimidine or their derivatives in an amount of 0.5 to 5 g./l.

By way of example, the following examples for suitable compositions are given, wherein the parts are given in grams per liter of the aqueous solution.

Example 1

| | Parts |
|---|---|
| Ammonium carbonate | 40 |
| Ammonium sulfate | 1.25 |
| Ammonium chloride | 10 |
| Phenol | 2.50 |
| Coal tar emulsion | 2.50 |
| Cresol | 2 |
| Pyridine | 1 |

Example 2

| | |
|---|---|
| Ammonium carbonate | 35 |
| Ammonium sulfate | 2.50 |
| Ammonium chloride | 5 |
| Phenol | 2.50 |
| Coal tar emulsion | 2.50 |
| Cresol | 2 |
| Pyridine | 1 |

Example 3

| | |
|---|---|
| Ammonium carbonate | 20 |
| Ammonium sulfate | 5 |
| Ammonium chloride | 10 |
| Phenol | 2.50 |
| Cresol | 2 |
| Coal tar emulsion | 2.50 |
| Wood tar (treated with soda) | 10 |
| Pyridine | 1 |

Example 4

| | |
|---|---|
| Ammonium carbonate | 10 |
| Ammonium sulfate | 5 |
| Ammonium chloride | 10 |
| Phenol | 2.50 |
| Cresol | 2 |
| Coal tar suspension | 2.50 |
| Wood tar (treated with soda) | 20 |
| Pyridine | 1 |

Example 5

| | Parts |
|---|---|
| Ammonium carbonate | 10 |
| Ammonium sulfate | 5 |
| Ammonium chloride | 10 |
| Phenol | 2.50 |
| Cresol | 2 |
| Coal tar suspension | 2.50 |
| Wood tar (treated with soda) | 40 |
| Pyridine | 1 |

The use of compositions like those specified hereinabove for impregnating or coating wooden concrete form linings has given results far superior to those obtained by the employment of the compositions used heretobefore. The planks can be removed from the cast concrete without any difficulties and are, without further treatment, ready to be used again. We do not know the reason for the better performance of our compositions, which are the result of a great number of tests with a great variety of ingredients. It seems that the specific effect of the mixtures is brought about by a kind of synergistic action of the components.

While it will be understood that the composition embodying our invention may be employed without the use of any special apparatus, we have illustrated in the accompanying drawing the application of such a composition to the production of a concrete block.

In the accompanying drawing:

Fig. 1 is a sectional view of a mold composed of wooden planks, the concrete having been poured;

Fig. 2 is a perspective view, partly broken away, showing a cement block produced in the mold of Fig. 1, the wooden planks removed from the block being indicated.

In the figures, the reference numeral 1 indicates wooden form members impregnated with the adhesion reducing composition of the invention, which members comprise in the present case sides and ends arranged together to form a mold for the production of the block; 2 indicates a mass of concrete poured into the mold, while 3 indicates on a scale which is enlarged over the true proportions according to the scale otherwise used, a surface layer of concrete which in contact with the impregnated mold appears to set more quickly than the remainder of the cement, which reduces the adhesion of the cement to the impregnated planks and allows their ready re-use.

Though we have described our invention with reference to wooden planks, it may also be used for forms comprised of fiber board, or other generally like or similar materials or various combinations thereof, also for metallic form linings for concrete and similar materials. And though we have herein set forth specific embodiments of our invention, it is not our intention to be limited wholly thereto, for to those skilled in the art there are many apparent variations and modifications such as the variations of quantities used and a substitution of equivalent materials that do not depart from the scope of our invention as set forth in the following claims.

We claim:

1. A composition suitable for reducing the adhesion of wood and similar materials to concrete containing as a major ingredient a mixture of ammonium carbonate, ammonium sulfate and ammonium chloride containing for 1 part of ammonium sulfate about 2–32 parts of ammonium carbonate and about 2–8 parts of ammonium chloride and as minor ingredients a wood preserving agent selected from the group consisting of phenols and cresols and a member of the group consisting of pyridine and pyrimidine.

2. An aqueous composition suitable for reducing the adhesion of wood and similar materials to concrete containing per liter 20 to 60 g. of a mixture of ammonium carbonate, ammonium sulfate and ammonium chloride, 1–10 g. of cresol and phenol, at least 2 g. of tar, and 0.5 to 5 g. of a member of the group consisting of pyridine and pyrimidine.

3. A concrete form lining impregnated with the composition defined in claim 1.

4. A composition as defined in claim 1 containing a small amount of a detergent.

References Cited in the file of this patent

UNITED STATES PATENTS

| Number | Name | Date |
|---|---|---|
| 967,982 | Schmidt | Aug. 23, 1910 |
| 1,004,844 | Bennett et al. | Oct. 3, 1911 |
| 1,985,092 | Hayden | Dec. 18, 1934 |
| 1,988,175 | Merrill | Jan. 15, 1935 |
| 2,296,553 | Heritage et al. | Sept. 22, 1942 |
| 2,390,408 | Young | Dec. 4, 1945 |
| 2,411,815 | Sowa | Nov. 26, 1946 |
| 2,439,440 | Rhodimer | Aug. 13, 1948 |
| 2,439,441 | Rhodimer | Aug. 13, 1948 |